United States Patent [19]

Korsch

[11] Patent Number: 4,576,447
[45] Date of Patent: Mar. 18, 1986

[54] COMPACT, SINGLE PIECE LASER BEAM ANALYZER

[75] Inventor: Dietrich G. Korsch, Huntsville, Ala.

[73] Assignee: The Boeing Company, Seattle, Wash.

[21] Appl. No.: 535,404

[22] Filed: Sep. 26, 1983

[51] Int. Cl.⁴ .............................................. G02B 17/00
[52] U.S. Cl. .................................................... 350/444
[58] Field of Search ................................. 350/442–444

[56] References Cited

U.S. PATENT DOCUMENTS 3,527,526  9/1970  Silvertooth ................. 350/443 X
3,584,937  6/1971  Nishimoto ................... 350/442 X

FOREIGN PATENT DOCUMENTS 75850  9/1954  Netherlands ...................... 350/444

Primary Examiner—John K. Corbin
Assistant Examiner—Scott J. Sugarman
Attorney, Agent, or Firm—Edwin H. Crabtree

[57] ABSTRACT

A compact single piece laser beam analyzer for performing highly accurate laser beam divergence measurements. The analyzer is wavelength independent and may be used with a variety of lasers.

4 Claims, 1 Drawing Figure

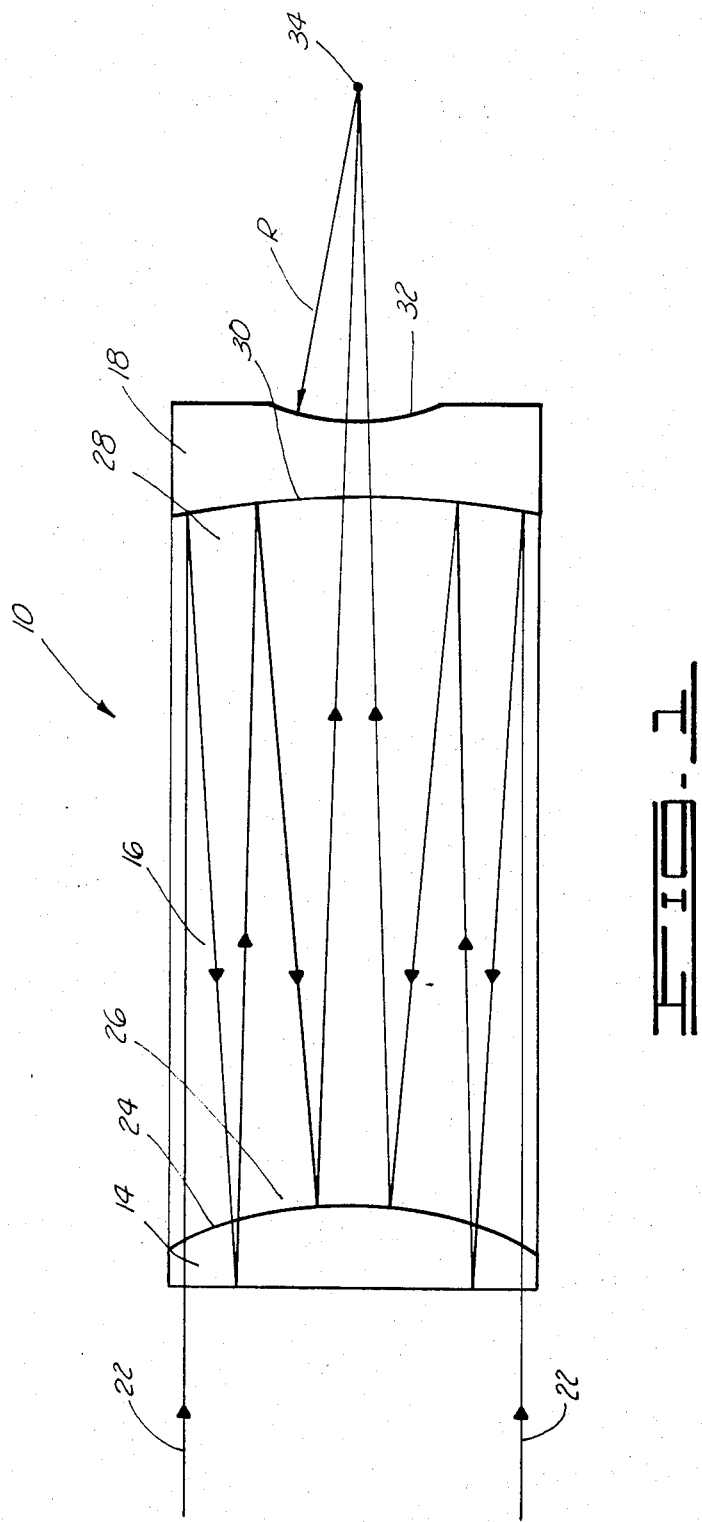

COMPACT, SINGLE PIECE LASER BEAM ANALYZER

BACKGROUND OF THE INVENTION

This invention relates to a laser beam analyzer and more particularly but not by way of limitation to a compact, single piece laser beam analyzer for measuring the divergence of a laser beam.

Heretofore, in analyzing laser beam divergence, telescopes have been used having very long focal lengths. This required instrumentation having extreme lengths or consisting of two or more components making the instrument extremely sensitive to misalignment. Further, these type units were more or less monochromatic making them useful for only one particular type of laser.

In the following U.S. patents, U.S. Pat. No. 3,748,015 to Offner, U.S. Pat. No. 4,121,890 to Braun, U.S. Pat. No. 4,342,502 to Chang and U.S. Pat. No. 4,344,676 to Shafer various types of imaging systems are disclosed and different types of lens arrangements and catadioptic telescope systems for the refractions and reflection of laser beams. None of these prior art inventions particularly point out the unique features and advantages of the subject invention as described herein.

SUMMARY OF THE INVENTION

The subject invention provides a laser beam optical instrument for performing highly accurate laser beam divergence measurements. The analyzer is compact, simple in structure and rigid in construction making it suitable for field use.

The laser beam analyzer is wavelength independent making it useful for divergence measurements of a variety of laser beams.

The compact single piece beam analyzer includes a solid cylinder of glass wherein the cylinder includes two internally partially transmitting, partially reflecting spherical surfaces. The glass cylinder also includes a flat entrance surface for receiving the beam therethrough and a concave spherical exit surface having a radius equal to the back focal point distance where the beam is focused on the focal point.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 1 is a side view of the laser beam analyzer showing the ray trace of a laser beam received therethrough.

DETAILED DESCRIPTION OF THE DRAWINGS

In FIG. 1 the compact, single piece laser beam analyzer is designated by general reference numeral 10. The analyzer 10 includes a solid cylinder of glass 12 made up of an entrance lens 14, an internal lens 16 and an exit lens 18.

The entrance lens 14 includes a flat entrance surface 20 for receiving a laser plain wave 22 therethrough. The entrance lens 14 also includes a first convex spherical surface 24 which is adjacent to and attached to a first end portion 26 of the internal lens 16. Adjacent to and attached to a second end portion 28 of the internal lens 16 is a first concave surface 30 of the exit lens 18. The exit lens 18 also includes a concave spherical exit surface 32 having a radius equal to a radius R of a focal point 34.

In operation, the ray trace of the beam 22 comes to the focal point 34 by the beam 22 passing through the flat entrance surface 20 and the first spherical convex surface 24 and through the internal lens 16 where it is reflected off of the first spherical concave surface 30. The beam 22 then passes back through the first spherical convex surface 24 where it is reflected off of the flat entrance surface 30. At this time, the beam 22 is then passed again through the first convex surface 26 and reflected off of the first concave 30 and the first spherical convex surface 26. The beam then passes through the first concave surface 30 and the concave spherical exit surface 32 where it is focused at focal point 34.

It should be noted that the light following any other possible ray trace is deflected out of the analyzer 10 with only a negligible portion of the beam 22 being accumulated as background at the focal point 34.

It can be appreciated that the analyzer 10 only requires the two internally, partially transmitting, partially reflecting spherical surfaces 24 and 30 with the entrance surface 20 and exit surface 32. Achromatism is obtained by using only internally reflected beams and by matching the flat entrance surface 20 and the concave spherical exit surface 32 with the respected wavefronts. Since a plane beam 22 is entering the system, the entrance surface 20 as mentioned above, is flat with the final exit surface 32 being spherical and concave with its radius equal to the radius R of the focal distance to point 34. In this way, any refraction has been avoided making the analyzer 10 over the transmission range of the beam 22 independent of various wavelengths.

Changes may be made in the construction and arrangement of the parts or elements of the embodiments as described herein without departing from the spirit or scope of the invention defined in the following claims.

What is claimed is:

1. A laser beam analyzer for measuring a laser light beam, the analyzer comprising:
    a solid cylinder of glass, the cylinder having two internally convex and concave partially transmitting, partially reflecting spherical surfaces, a flat entrance surface for receiving the entire beam across the surface thereof and a concave spherical exit surface.

2. The analyzer as described in claim 1 wherein the concave spherical exit surface has a radius equal to a back focal distance for focusing the beam received through the analyzer.

3. A laser beam analyzer for measuring a laser light beam, the analyzer comprising:
    a solid cylinder of glass, the glass including:
        an entrance lens having a flat entrance surface for receiving the entire beam across the surface thereof, and a first convex spherical surface on the opposite side thereof;
        an internal lens, one end of the internal lens indexed adjacent to the first convex surface and secured thereto; and
        an exit lens having a first concave surface on one side thereof, the first concave surface indexed adjacent to and secured to the other end of the internal lens and a concave spherical surface on the opposite side thereof.

4. The analyzer as described in claim 3, wherein the concave spherical exit surface of exit lens has a radius equal to a back focal distance for focusing the beam received through the analyzer.

* * * * *